United States Patent [19]
Reimann

[11] 3,801,149
[45] *Apr. 2, 1974

[54] AUTOMOBILE BODY STRUCTURE INCORPORATING HINGED HOUSING

[76] Inventor: Gerhard Paul Reimann, 145 George St., Toronto 229, Ontario, Canada

[ * ] Notice: The portion of the term of this patent subsequent to May 30, 1989, has been disclaimed.

[22] Filed: Oct. 12, 1971

[21] Appl. No.: 187,959

[30] Foreign Application Priority Data
Sept. 8, 1971 Canada.................................. 122289

[52] U.S. Cl..................... 296/23 R, 296/26, 296/69, 296/153
[51] Int. Cl............................. B60n 1/10, B60p 3/34
[58] Field of Search............ 296/23 R, 23 H, 26, 69, 296/152, 153, 146

[56] References Cited
UNITED STATES PATENTS

| | | | |
|---|---|---|---|
| 3,666,315 | 5/1972 | Reimann.............................. | 296/69 |
| 2,154,810 | 4/1939 | Goeddertz......................... | 296/23 R |
| 2,676,839 | 4/1954 | Lacoste............................. | 296/23 H |
| 2,782,068 | 2/1957 | Esche............................. | 296/152 X |
| 3,558,180 | 1/1971 | Algire ............................... | 296/23 R |
| 2,856,645 | 10/1958 | Herrmeyer.................... | 296/23 R X |
| 2,661,233 | 12/1953 | Sidel.............................. | 296/152 X |

Primary Examiner—David Schonberg
Assistant Examiner—Leslie J. Paperner
Attorney, Agent, or Firm—J. Noel Walton

[57] ABSTRACT

A housing including a window frame is hingedly mounted along its top edge in the door of an automobile body structure for movement between extended and retracted positions so as to provide additional sleeping width for a person lying on a seat of the automobile. An intermediate sloping panel within the housing separates an inwardly open recess from an outwardly disposed window-receiving compartment. Within the recess, there is provided an upwardly facing supporting surface which is generally coplanar with a top surface of the seat when the housing is moved into its extended position. A cushion member is disposed between the door and the seat and such a cushion member has a top surface which is also coplanar with the top surface of the seat and with the supporting surface in the housing when that housing is moved into its extended position. The cushion member is usefully formed with terminal guide pins so that it can be removably supported in slots formed in webs defining the front and rear ends of the recess so that the cushion member then provides an arm rest when the housing is in its retracted position.

29 Claims, 11 Drawing Figures

AUTOMOBILE BODY STRUCTURE INCORPORATING HINGED HOUSING

BACKGROUND OF THE INVENTION

The present invention relates to automobile body structures and more particularly to the provision of means in an automobile body structure so that one or more seats of the automobile can more effectively be used for sleeping or resting by the driver or passengers of the vehicle.

Many proposals have heretofore been made concerning the provision of automobile seats which can be used as mattresses or converted into mattresses for sleeping purposes but many of the previous proposals have involved the use of particularly complex seat-mounting structures.

It has also been proposed, particularly with regard to permitting the drivers of trucks to sleep in the cabs of their vehicles, to provide transversely extensible housings on the doors of such truck cabs. Such housings have been designed to extend transversely outwardly beyond the outer panels of the doors of the truck and internally to accommodate the driver's head and feet while he is resting on the bench-type seat in the truck cab. When not in use, such housings are retracted into the doors, for example, telescopically or hingedly, so that they do not project transversely outwardly from the vehicle when the latter is being driven. With arrangements of this particular type, it has been possible to provide temporary additional sleeping length for a driver even in the relatively narrow widths available in the cabs of many trucks. Such previously proposed arrangements have, however, suffered from the disadvantages that they cannot readily be applied to automobile body structures particularly from the point of view of providing a satisfactory external appearance to the outer panels of the doors on which such structures are mounted and that they provide only limited additional space.

In many present day automobile body structures, considerable transverse space is taken up by the side walls and the doors of the automobile. Such side walls and doors are frequenty as thick as 7 inches or more and, although the seats provided in present day automobiles are generally not in themselves wide enough to provide adequate sleeping lengths for a person resting thereon, adequate length could in many automobiles be obtained if the additional width taken up by the thickness of each of the side walls or the doors could also be utilized.

It has in the past been proposed to utilize the space available in the doors of automobiles as is made possible by the present invention but such previous proposals have precluded the use of conventional wind-down windows or have at least prevented such windows from being fully opened while the space available within the door is being utilized to provide additional sleeping space.

It is accordingly a general object of this invention to provide an automobile body structure in which the space existing between the inner and outer panels of the side walls and particularly the space existing between the inner and outer panels of the doors of an automobile can be utilized to increase the width available for a driver or other occupant of the automobile lying on a seat of the automobile.

More particularly, it is an important object of this invention to provide an automobile body structure in which a seat is transversely disposed between the side walls of the body structure and in which the available sleeping width of such a seat can be extended when so required by utilization of a major portion of the space between the inner and outer panels of the side walls of the vehicle.

Another object of this invention is to permit the use of the space available within the side walls and doors of an automobile body structure without restricting the operation of wind-down windows provided in such side walls or doors.

Other objects of the invention will become apparent as the description herein proceeds.

SUMMARY OF THE INVENTION

This invention involves the provision in an automobile body structure of the type specified and in which each of the side walls of the automobile includes an inner wall or panel and spaced apart outwardly therefrom an outer wall or panel, of a housing including an upwardly facing supporting surface providing additional sleeping width for a person resting on a seat extending transversely between the side walls.

Broadly, the present invention provides an automobile body structure which comprises transversely spaced apart side walls each defined by transversely spaced apart inner and outer panels; a seat transversely disposed between said side walls and in turn including a seat portion with a top surface; a housing defined by top, bottom and front and rear side edges, having an inner panel and an essentially continuous outer panel, and hingedly mounted along said top edge thereof in one said side wall of said automobile body structure for movement between an outer extended position an an inner retracted position in which said outer panel of said housing is essentially continuous with said outer panel of a respective one of said side walls of said automobile body structure; an opening in said inner panel of said housing and peripherally defining a recess extending transversely outwardly into said housing from said inner panel thereof; an intermediate panel in said housing spaced apart transversely inwardly from said outer panel of said housing outwardly to define said recess and to define with said outer panel of said housing a window-receiving compartment; a window frame constituted by an opening in an upper portion of said housing above said recess therein; a window pane movably mounted in said housing for movement between a raised position closing said opening constituting said window frame and a lowered position in which said window pane is at least partially disposed within said window-receiving compartment; an upwardly facing supporting surface provided in a lower part of said recess in said housing, said supporting surface being generally coplanar with said top surface of said seat portion of said seat when said housing is disposed in said extended position thereof; and a cushion member dimensioned for disposition between said seat portion of said seat and said inner panel of a respective said side wall of said automobile body structure when said housing is disposed in said extended position thereof, said cushion member having a top surface which is essentially coplanar with said top surface of said seat portion of said seat and with said supporting surface within said recess in said housing when said cushion member is so disposed between said portion and said inner panel of said respective side wall of said automobile body structure thereby to provide jointly with said supporting surface in said recess an essentially continuous transverse extension of said top surface of said seat portion of said seat.

In accordance with a particularly useful feature of this invention, the aforementioned upwardly facing supporting surfaces are provided in recesses in turn provided in doors which are hingedly mounted in a conventional manner in the side wall of the automobile body.

A particularly important advantage presented by an automobile body structure in accordance with this invention is that such structure provides a considerable increase in space for a person lying on the seat of such an automobile. As a result, the invention will find considerable utility in automobiles of relatively smaller widths than many of the heretofore proposed systems having the same object.

Other features and advantages of the invention will become apparent as the description herein proceeds.

BRIEF DESCRIPTION OF THE DRAWINGS

The invention will now be described merely by way of illustration with reference to the accompanying drawings in which.

DESCRIPTION OF PREFERRED EMBODIMENT

Figure 1:
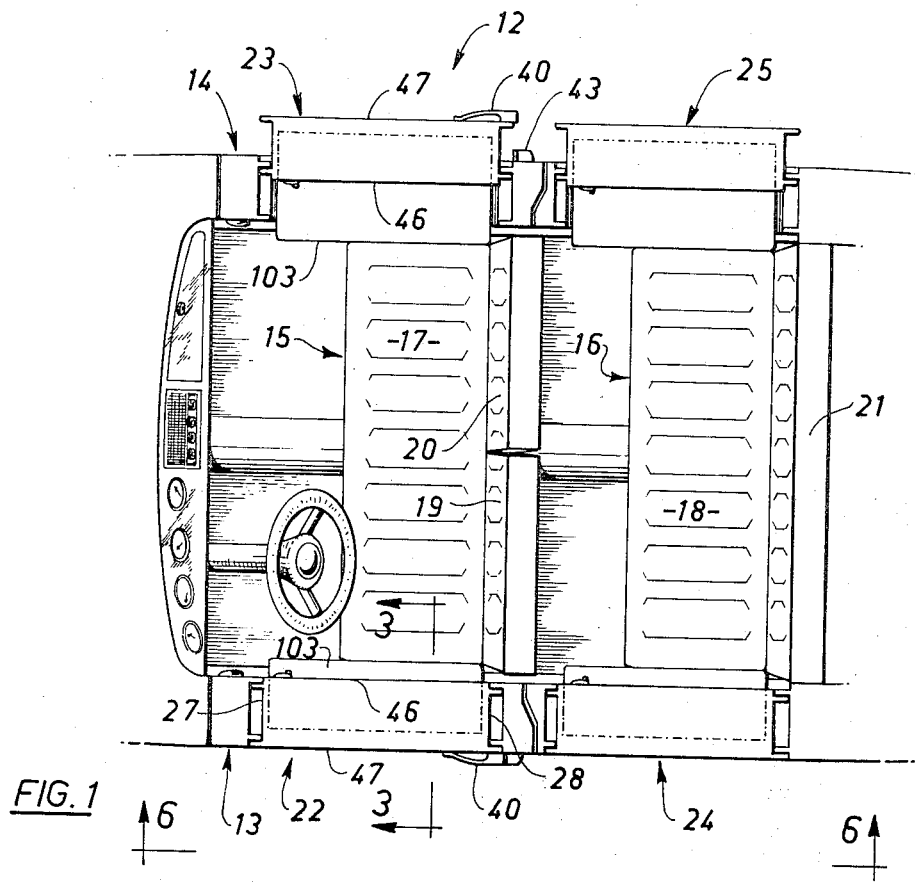
FIG. 1 is a somewhat schematic internal plan view of a two-door automobile constructed in accordance with this invention and showing the disposition of the doors and the front and rear seats thereof as well as showing four housings provided in the automobile body structure in accordance with this invention, two such housings being shown in their retracted position and two such housings being shown in their extended positions.
Figure 2:
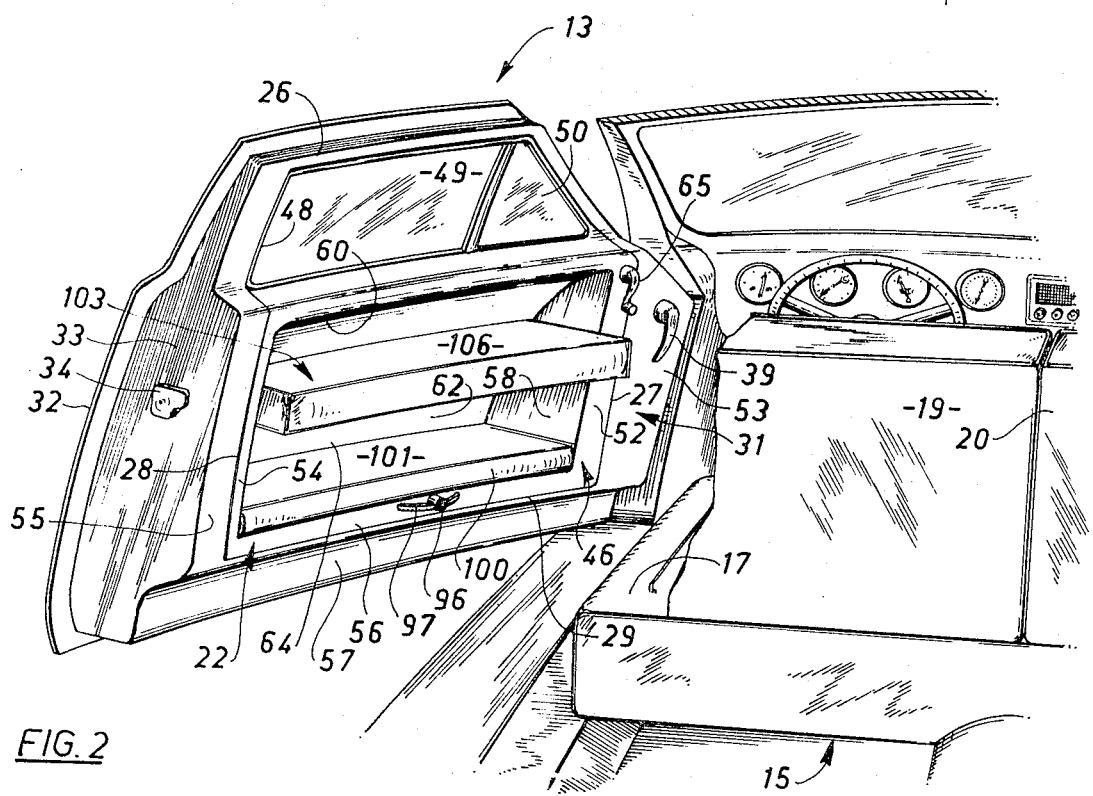
FIG. 2 is a fragmentary perspective view of the interior of the automobile of FIG. 1 with certain parts cut away or omitted and particularly showing the construction in accordance with this invention of the door on the driver's side of the automobile.

Referring first to FIGS. 1 and 2 of the accompanying drawings, there is shown therein fragmentarily and generally at 12 a two-door automobile body structure having transversely aligned front doors 13 and 14. Disposed within the body structure 12, there are provided front and rear seats generally indicated at 15 and 16 respectively and including seat portions 17 and 18 respectively It will be noted that the seat portion 17 of the front seat 15 is disposed essentially between the doors 13 and 14 and that the front seat 15 also includes left-hand and right-hand back rests 19 and 20 respectively which can be pivoted forwardly in a conventional manner to permit passenger access to the rear seat 16. The rear seat 16 includes a fixed back rest 21.

The doors 13 and 14 are hingedly mounted at their front edges on the body structures 12 in a conventional manner by hinges (not shown). Since the doors 13 and 14 are constructed in identical manners except of course that one is effectively a mirror image of the other, the structure of only one such door, namely door 13, will be described in greater detail herein.

In accordance with this invention, there is hingedly mounted within the door 13 a housing which is generally indicated at 22. A similar housing generally indicated at 23 is hingedly mounted in the door 14 while similar housings generally indicated at 24 and 25 are mounted in the left-hand and right-hand side walls respectively of the automobile body structure 12 in general transverse alignment with the seat portion 18 of the rear seat 16 thereof.

Figure 3:
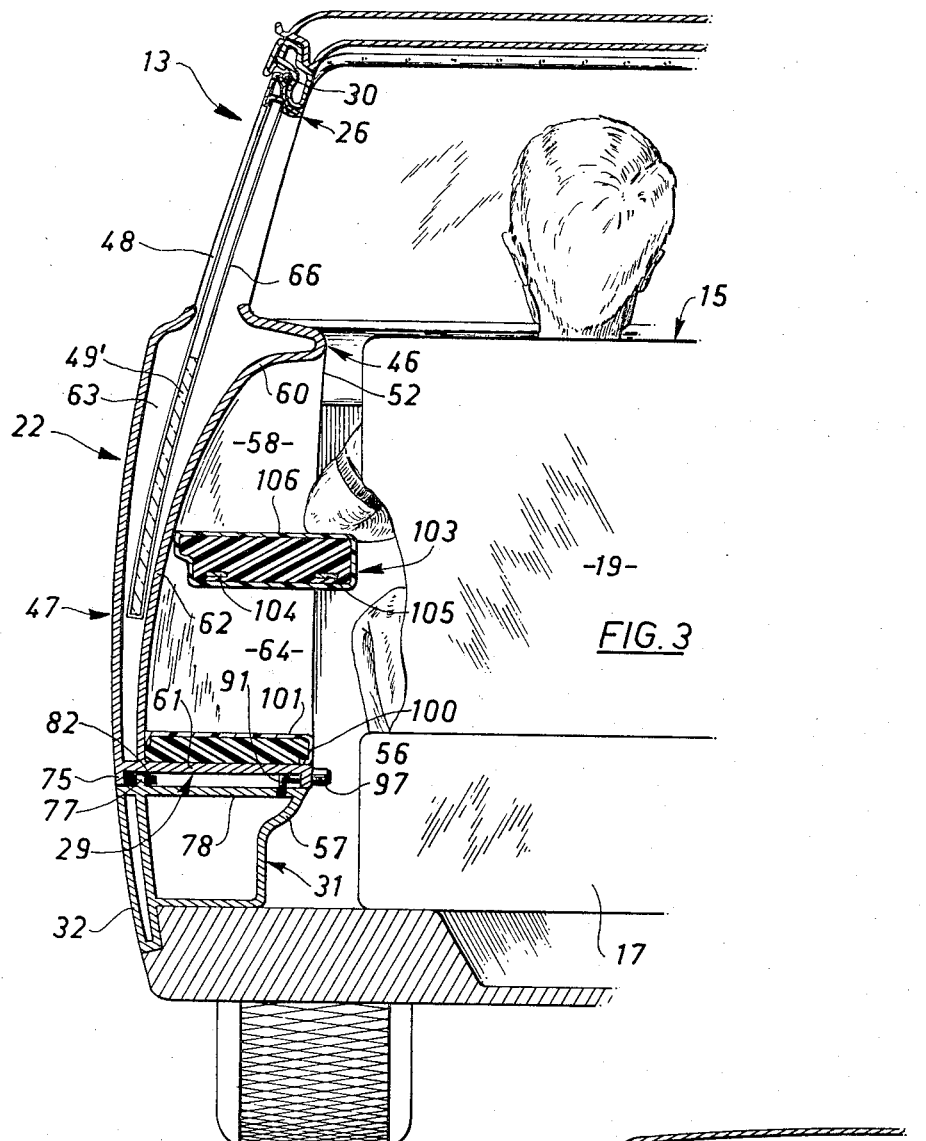
FIG. 3 is a somewhat schematic and fragmentary vertical sectional view through the automobile body structure shown in FIGS. 1 and 2 when taken as indicated by the arrows 3—3 of FIG. 1 and showing in its inner retracted position the housing which is hingedly mounted in the door on the driver's side.
Figure 10:
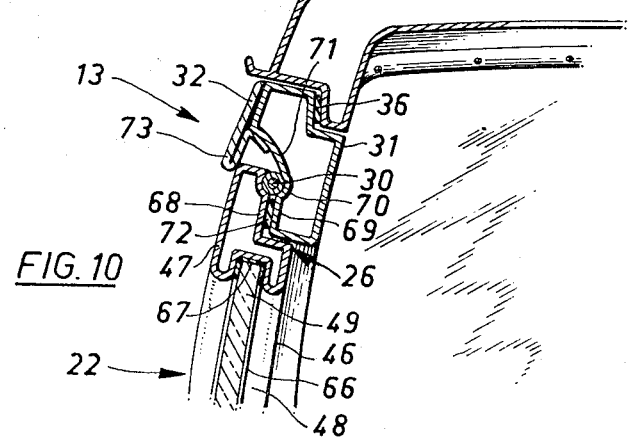
FIG. 10 is a fragmentary vertical sectional view on an enlarged scale through the automobile body structure of the preceding figures when taken as indicated by the arrows 10—10 in FIG. 6 and showing the housing in the door on the driver's side of the automobile in its inner retracted position.
Figure 4:
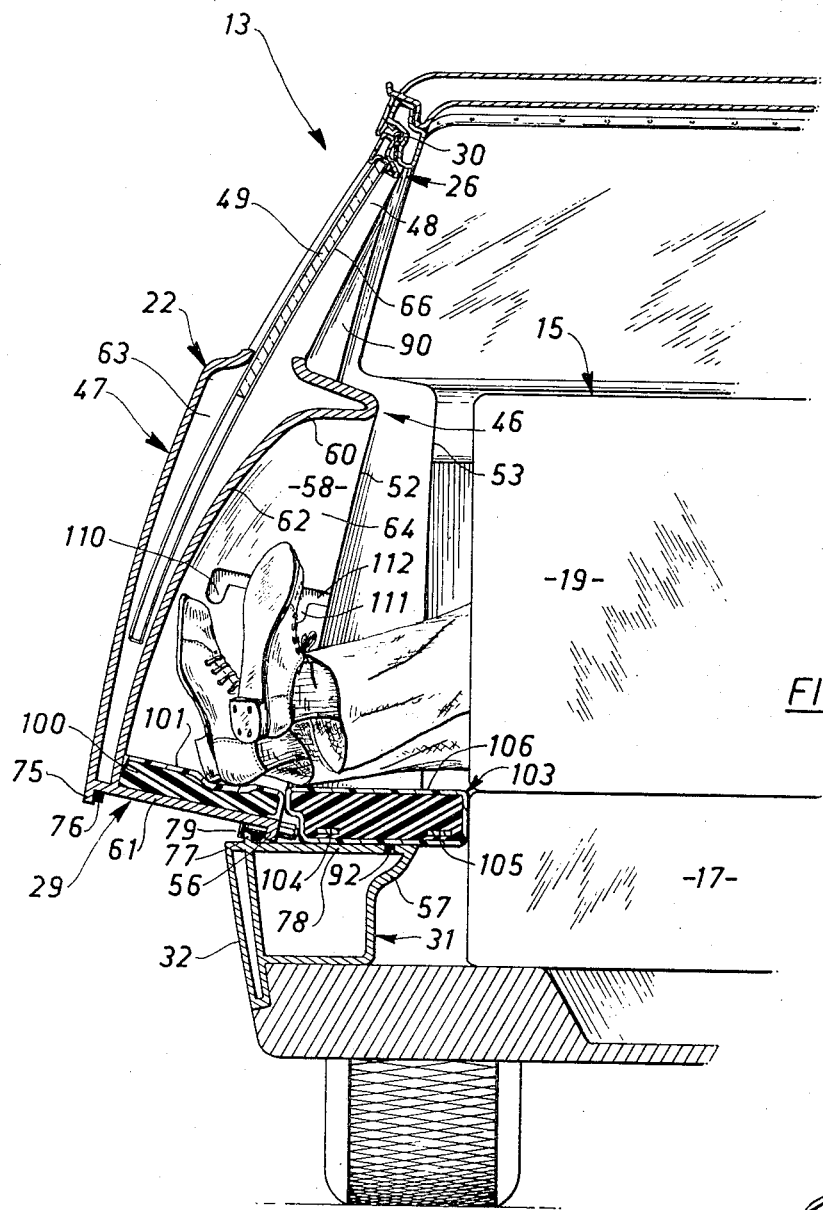
FIG. 4 is a schematic and fragmentary vertical sectional view similar to that of FIG. 3 but showing the housing of the door in its outer extended position.
Figure 11:
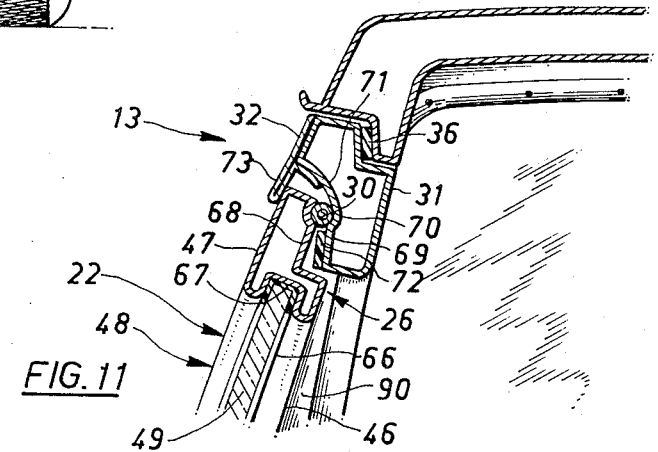
FIG. 11 is a fragmentary vertical sectional view similar to that of FIG. 10 but showing the housing in its outer extended position.
Figure 6:
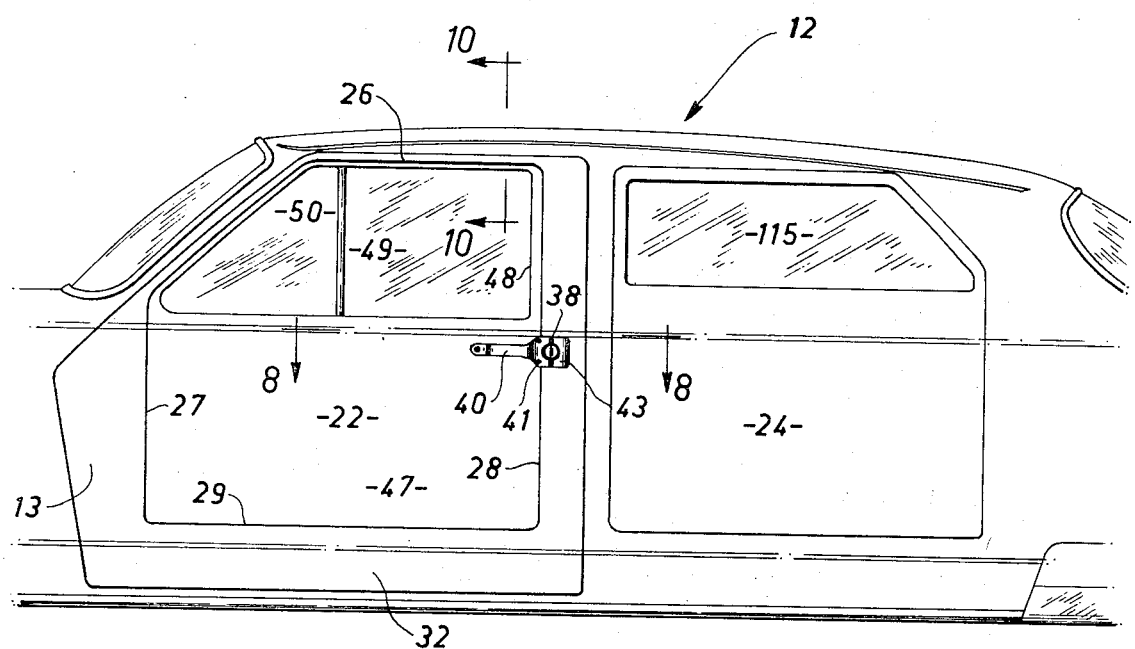
FIG. 6 is a fragmentary side elevation of the automobile body structure of the preceeding figures when viewed as indicated by the arrows 6—6 of FIG. 1.
Figure 8:
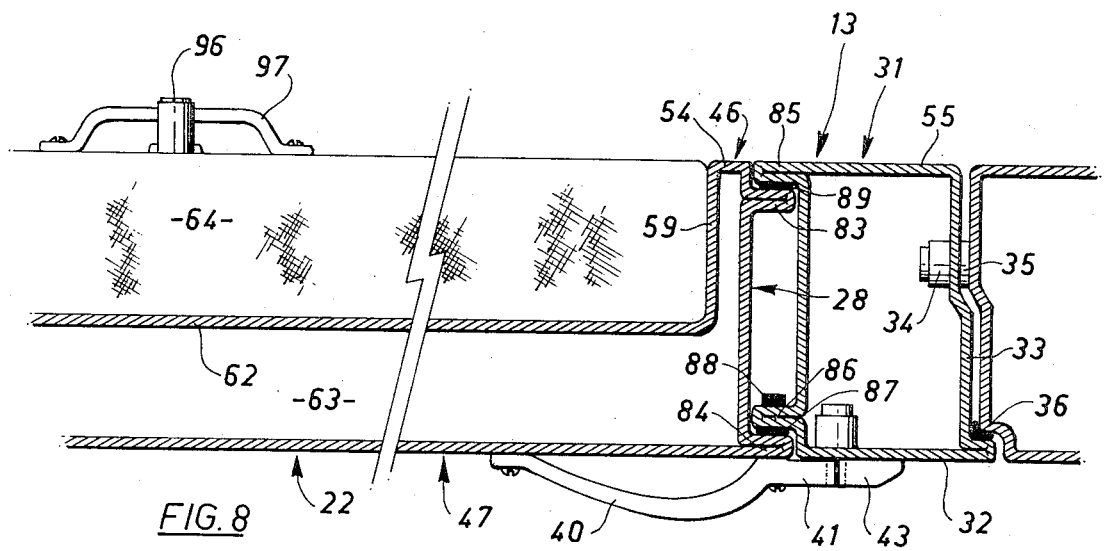
FIG. 8 is a fragmentary horizontal sectional view on an enlarged scale through the automobile body structure of the preceding figures when taken as indicated by the arrows 8—8 of FIG. 6 and showing the housing in the door on the driver's side of the automobile in its inner retracted position.
Figure 9:
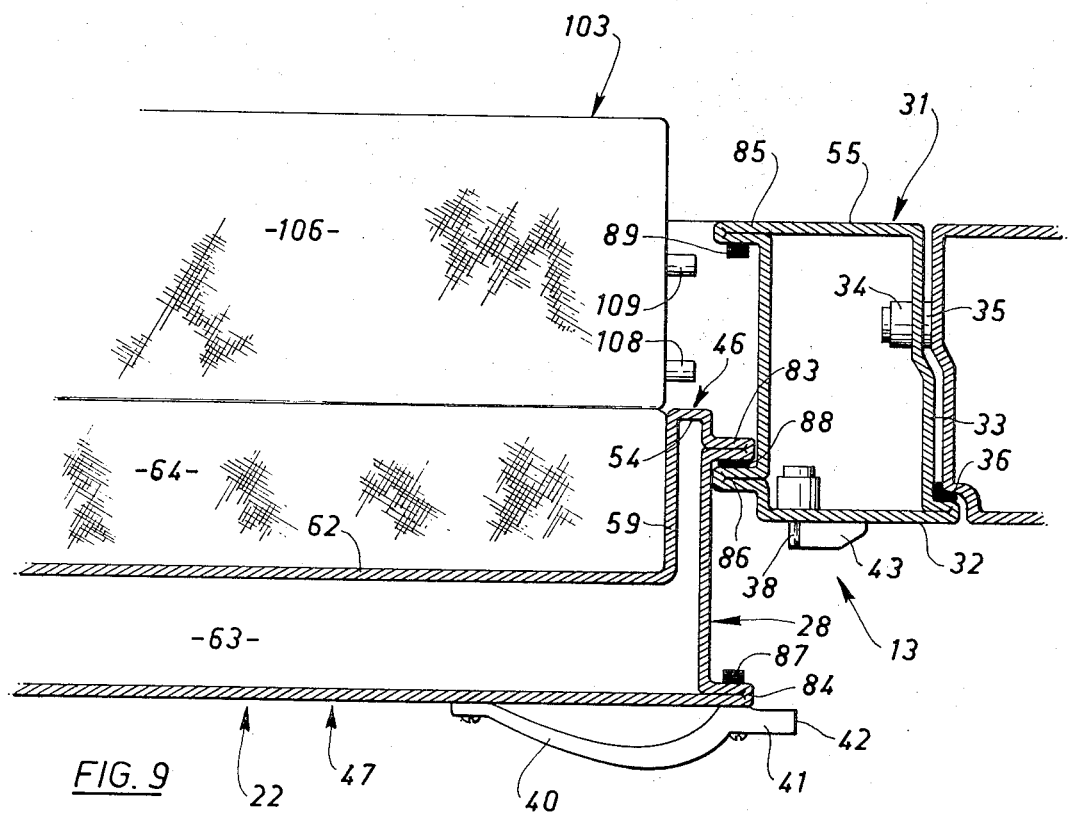
FIG. 9 is a fragmentary horizontal sectional view similar to that of FIG. 8 but showing the housing in its outer extended position.

The housing 22 in the door 13 is defined by a top edge 26, front and rear side edges 27 and 28 respectively and a bottom edge 29 and is hingedly mounted in the door 11 by hinges generally indicated at 30 and provided along the top edge 26 so that the housing 24 can be moved between an inner retracted position as illustrated in FIGS. 1, 2, 3, 6, 8 and 10 and an outer extended position thereof as illustrated in FIGS. 4, 9 and 11. The structure of the hinges 30 will be described in greater detail hereinafter. It can, however, be noted at this juncture that the housing 23 in the door 14 and the housing 25 in the rear portion of the right-hand side wall of the automobile body structure 12 are shown in FIG. 1 as being disposed in their extended positions while the housings 24 in the rear portion of the left-hand side wall of the automobile body structure 12 is shown in FIGS. 1 and 6 as being disposed in its retracted position.

It will be seen from FIGS. 1, 3 and 4 that the door 13 essentially constitutes an outer frame formed from transversely spaced apart inner and outer panels or walls 31 and 32 respectively and, in which frame, the housing 22 is hingedly mounted for movement between its extended and retracted positions.

The door 13 is provided on its rear edge surface 33 (FIG. 2) with a latching and locking mechanism generally indicated at 34 and generally of a conventional type and which engages a co-operating fixed member 35 on the body structure as shown in FIGS. 8 and 9. Sealing strips 36 are provided in a conventional manner around the door 13. An outside door latch-actuating button 38 is mounted on the outer panel 32 of the door 13 rearwardly of the housing 22 while an inside door latch-actuating handle 39 is suitably mounted on the inner panel 31 of the door 13 forwardly of the front side edge 27 of the housing 22. Suitable linkages (not shown) extend between the handle 39 and the latching and locking mechanism 34 within the door 13. For example, such linkages can extend downwardly from the handle 39, rearwardly between the inner and outer panels 31 and 32 respectively of the door 13 below the housing 22 and finally upwardly and rearwardly of the housing 22 to the latching and locking mechanism 34. It will now be understood that the door 13 can be opened from inside the automobile in a conventional manner using the handle 39.

Since the rear side edge 28 of the housing 22 is disposed in close proximity to the outside door latch-actuating button 38, the door handle conventionally provided alongside such a button is usefully formed as a separate handle member 40 which is mounted on the outside of the housing 22 so as to be disposed adjacent the button 38 when the housing 22 is moved into its retracted position. Referring particularly to FIGS. 6, 7, 8 and 9, it will be seen therefrom that such a handle member 40 is usefully formed with a rearward extension 41 having a semi-cylinder rear surface 42 which is adjacent the forward half of the buttom 38 when the housing 22 is moved into its retracted position. A fixed plate 43 having a forwardly facing semi-cylindrical surface 44 can, if desired, be provided on the outer wall 32 of the door 13 rearwardly of the button 38 to provide a more conventional appearance.

From FIGS. 2, 3, 4 and 8 to 11, it will be seen that the housing 22 comprises transversely spaced apart inner and outer panels 46 and 47 respectively, the outer panel 47 being essentially continuous with the outer panel 32 of the door 13 when the housing 22 is disposed in its retracted position as will be readily understood by reference to FIGS. 3 and 6. In its upper part, the housing 22 is formed with corresponding openings in its inner and outer panels 46 and 47 respectively to provide a window frame generally indicated at 48 and in which a main window 49 and a deflector window 50 are mounted. The manner in which the main window 49 is mounted will be explained in greater detail as the description herein proceeds. Below the window frame 48, the inner panel 46 of the housing 22 is shaped so as to form relatively narrow extensions of the adjacent portions of the inner panel 31 of the door 13 when the housing 22 is disposed in its retracted position. For example, at the forward edge 27 of the housing 22, the inner panel 46 of the housing 22 forms a narrow rearward extension 52 of a front portion 53 of the inner panel 31 of the door 13 and, at the rear edge 28 of the housing 22, the inner panel 46 thereof form a narrow forward extension 54 of a rear portion 55 of the inner panel 31 of the door 13. Similarly, the inner panel 46 of the housing 22 extends upwardly at 56 from the bottom edge 29 thereof as an extension of a lower portion 57 of the inner panel 31 of the door 13. The inner wall 46 of the housing 22 is also shaped around the window frame 48 to correspond to the adjacent shaping of the inner panel 31 of the door 13 as will be readily understood by reference to FIG. 2.

Inwardly of the aforementioned portions 52, 54 and 56 of the inner panel 46 of the housing 22 and below the window frame 48, that inner panel 46 extends transversely outwardly as front and rear generally vertical webs 58 and 59 respectively and as top and bottom webs 60 and 61 respectively to an intermediate panel generally indicated at 62 and which is spaced apart inwardly from the outer panel 47 of the housing 22 to define therewith a window-receiving compartment generally indicated at 63 (FIG. 3) having a relatively narrow transverse width. It will further be seen from FIGS. 2, 3 and 4 that the housing 24 includes an inwardly open recess 64 which is outwardly defined by the intermediate panel 62 and about its edges by the aforementioned webs 58, 59, 60 and 61.

It will be seen from FIGS. 3 and 4 that the outer panel 47, the intermediate panel 62 and the top web 60 of the housing 22 are dimensioned to allow the main window 49 to be moved between its raised closed position as shown in FIG. 4 and its lowered open position as indicated at 49' in FIG. 3. A window-positioning handle 65 shown only in FIG. 2 is mounted on the extension 52 of the inner panel 46 of the housing 22 and suitable linkages (not shown) extend from that handle 65 to the window 49. Side guide strips 66 and a top edge sealing strip 67 are provided in the window frame 48.

Referring now more particularly to FIGS. 10 and 11, it will be seen therefrom that the aforementioned hinges 30 are secured between an inwardly facing web 68 provided on the top edge 26 of the housing 22 and an opposed outwardly facing portion 69 of a web 70 extending between the inner and outer panels 31 and 32 respectively of the door 13 above the housing 22. It will also be noted that above the hinges 30, the web 70 is spaced apart upwardly at 71 from the top edge 26 of the housing 22 to allow that housing to swing outwardly into its extended position. A compressible seal 72 is provided between the webs 68 and 70 and the outer panel 32 of the door 13 above the housing 22 is provided with a downwardly extending sealing lip 73 to prevent the ingress of rain through the space between the housing 22 and the door 13.

Along the bottom edge 29 of the housing 22, the outer panel 47 thereof is formed with a downwardly directed lip 75 which is in turn provided along its inner edge surface with a rubber sealing strip 76. A corresponding slightly inwardly inset and upwardly extending flange 77 is formed on a web 78 extending between the outer and inner panels 32 and 31 respectively of the door 13 below the housing 22 so that the rubber sealing trip 76 is compressed between the the lip 75 and the flange 77 when the housing 22 is moved into its retracted position. The flange 77 is disposed slightly inwardly of the outer panel 32 of the door 13 to define a recess 79 which receives the rubger sealing strip 76 and the lip 75 so ensuring a continuous outer surface between the door 13 and the outer panel 47 of the housing 22 when the latter is disposed in its retracted position.

The bottom web 61 of the housing 22 is secured along its inner edge to the aforementioned extension 56 forming a downwardly extending lip which engages a rubber sealing strip 82 secured to the inner edge surface of the aforementioned flange 77 so as to provide sealing engagement between the housing 22 and the door 13 when the former is moved into its extended position as will be readily understood by reference to FIG. 4.

Similarly, inner and outer edge lips 83 and 84 respectively are provided along the front and rear side edges 27 and 28 respectively of the housing 22 for co-operating in the same manner with inner and outer edge lips 85 and 86 and rubber sealing strips 87, 88 and 89 (FIGS. 8 and 9) on the door 13 to ensure effective sealing between the housing 22 and the door 13 along each side edge of the housing 22 while permitting movement of that housing between its extended and retracted positions.

In view of the relatively small transverse thickness of both the door 13 and the housing 22 forwardly and rearwardly of the window frame 48, it has proved necessary to provide an additional member 90 at each of the front and rear side edges 27 and 28 respectively of the housing 22 for the puspose of bridging the gap between the housing 22 and the door 13 when the former is disposed in its extended position. Such an additional member is shown in FIGS. 4 and 11 as being in the form of a generally triangular plate which is pivotally mounted at its upper apex on the door 13. Co-operating edge flanges (not shown) are provided on the plate 90 and on the opposed surfaces of the housing 22 so that, as the housing 22 is moved from its retracted position into its extended position, interengagement of the such flanges causes the plate 90 to be pivoted outwardly to cover the gap which would otherwise be opened between the door 13 and the housing 22.

For the purpose of holding the housing 22 in either of its retracted or extended positions, an appropriate latching mechanism schematically indicated at 91 is mounted on the undersurface of the aforementioned bottom web 61 of the housing 22 generally centrally thereof for engagement with a co-operating striker plate 92 mounted generally centrally in the top surface of the web 78 of the door 13 in proximity to the transverse inner edge thereof. A second striker plate is provided generally centrally on the outer surface of the flange 77 for engagement with the latching mechanism 91 for holding the housing 22 in its extended position. A latch-actuating button 96 and handle 97 are suitably mounted generally centrally on the extension 56 of the inner panel 46 of the housing 22 slightly upwardly of the bottom edge 29 thereof. By means of the described latching mechanism, the housing 22 can be locked in its retracted position and released from that position, when desired, and then moved outwardly into its extended position in which it can also be releasably locked by the aforesaid latching mechanism.

On the top surface of the aforementioned bottom web 61 defining the recess 64 in the housing 22, there is provided a permanently fixed resilient cushion or padding 100 in turn having a top surface 101 which is disposed at approximately the same level as the top surface of the seat portion 17 of the front seat 15 when the housing 22 is moved outwardly into its extended position.

Figure 5:
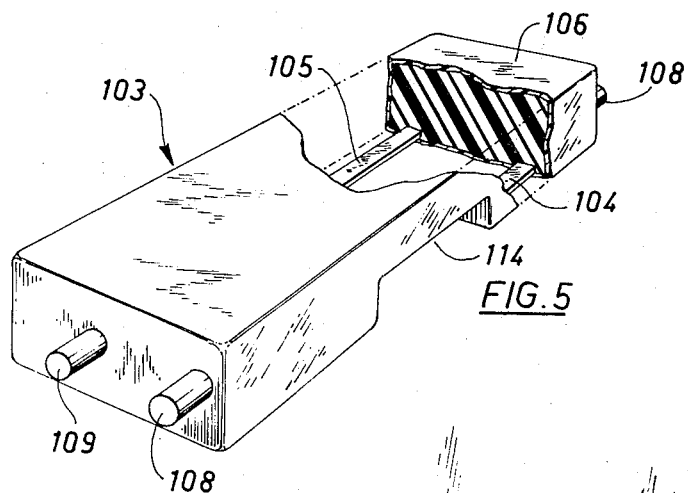
FIG. 5 is a perspective view from its outer side, on an enlarged scale and partly in section of a cushion member which also functions as an arm rest when it is removably mounted in the door of the automobile as shown in FIGS. 2 and 3.
Figure 7:
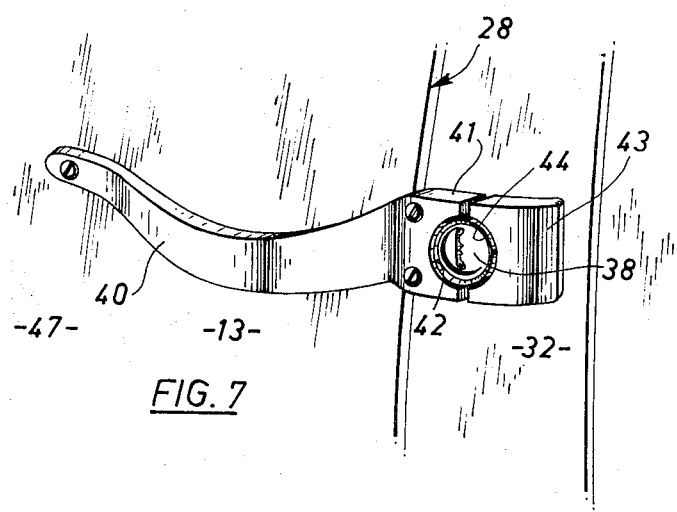
FIG. 7 is a perspective view on an enlarged scale of the door latch-actuating member or handle provided on the outside of the door shown in FIG. 2.

A resiliently padded cushion member generally indicated at 103 in FIG. 5 and having lateral frame members 104 and 105 and a top surface 106 is removably mounted within the recess 64 in the housing 22 as shown in FIG. 3, in which position it functions as an arm rest for a person sitting on the seat 15. By removing the cushion member or arm rest 103 from the recess 64 in a manner yet to be described, that member can be disposed between the housing 22 and the front seat 15 with its top surface 106 then being generally coplanar with the top surface 101 of the padding 100 in the bottom of the housing 22 as well as with the top surface of the seat portion 17 of the front seat 15.

At each of its ends, the arm rest 103 is provided with two longitudinally extending and transversely spaced apart pins 108 and 109 which are removably received in detent slots 110 an 111 respectively in respective ones of the front and rear webs 58 and 59 defining the recess 64 in the housing 22 so as to support the arm rest 103 in the position shown in FIG. 3, in which position it functions as an actual arm rest. Generally horizontal slots 112 are formed in the webs 58 and 59 to allow removal of the arm rest 103 from the position shown in FIG. 3 when that arm rest is lifted to move the pins 108 and 109 at each end of the arm rest out of respective ones of the detent slots 110 and 111, and then moved transversely inwardly.

It will be seen from FIG. 5 that the arm rest 103 is formed with a generally central cut-away portion 114 which extends between the rear surface and the undersurface of that arm rest for the purpose of accommodating the latch-actuating handle 97 when the arm rest 103 is disposed between the door 13 and the front seat 15 as actually shown in FIG. 4.

Since the doors 13 and 14 of the automobile body structure 12 are constructed in essentially identical manners, corresponding structural components of those two doors are indicated by the same legends in FIG. 1.

The housings 24 and 25 provided in the left-hand and right-hand side walls of the automobile body structure 12 in general transverse alignment with the seat portion 18 of the rear seat 16 have essentially the same construction as that of the housing 22 already described herein but are of course mounted directly on the side walls of the automobile body structure 12 rather than in doors which are in turn mounted in such side walls. With firther reference to the housings 24 and 25, it will be seen from FIG. 6 that the windows 115 provided in those houings are somewhat shallower than the windows in the housings 22 and 23 so as to provide more space for the head and feet of a person lying on the rear seat 16.

Although the invention has been described with particular reference to the automobile body structure shown in the accompanying drawings, it should be understood that the invention is equally applicable to automobile body structures differing in many ways from the illustrated structure.

Merely by way of illustration, it can be indicated that it is equally within the scope of this invention to provide a housing of the type described in one or both side walls of an automobile body structure and to provide such housings in some or all of the doors of a four-door automobile.

Similarly, the invention is not restricted to the structures hereinbefore specifically described for locking the movable housings in their retracted and extended positions or for removably supporting the arm rests, such as the arm rest 103, in their elevated positions in the housings as actually described herein. In fact, it is also within the scope of this invention to utilize cushion members for disposition between the transverse ends of a seat of an automobile body structure and the supporting surfaces provided in housings in the side walls of such an automobile body structure and which cushion members do not also function as arm rests but which, when not in use, are simply stored in an appropriate place in the automobile, for example, in the trunk of the vehicle.

Similarly, the invention also embraces structures for mounting and sealing the housings in the side walls of automobile body structures and which mounting and sealing structures differ from those hereinbefore specifically described.

What is claimed is:

1. An automobile body structure which comprises:
   transversely spaced apart side walls each defined by transversely spaced apart inner and outer panels;
   a seat transversely disposed between said side walls and in turn including a seat portion with a top surface;
   a housing defined by top, bottom and front and rear side edges, having an inner panel and an essentially continuous outer panel, and hingedly mounted along said top edge thereof in one said side wall of said automobile body structure for movement between an outer extended position and an inner retracted position in which said outer panel of said housing is essentially continuous with said outer panel of a respective one of said side walls of said automobile body structure;
   an opening in said inner panel of said housing and peripherally defining a recess extending transversely outwardly into said housing from said inner panel thereof;
   an intermediate panel in said housing spaced apart transversely inwardly from said outer panel of said housing outwardly to define said recess and to define with said outer panel of said housing a window-receiving compartment;
   a window frame constituted by an opening in an upper portion of said housing above said recess therein;
   a window pane movably mounted in said housing for movement between a raised position closing said opening constituting said window frame and a lowered position in which said window pane is at least partially disposed within said window-receiving compartment;
   an upwardly facing supporting surface provided in a lower part of said recess in said housing, said supporting surface being generally coplanar with said top surface of said seat portion of said seat when said housing is disposed in said extended position thereof; and
   a cushion member dimensioned for disposition between said seat portion of said seat and said inner panel of a respective said side wall of said automobile body structure when said housing is disposed in said extended position thereof, said cushion member having a top surface which is essentially coplanar with said top surface of said seat portion of said seat and with said supporting surface within said recess in said housing when said cushion member is so disposed between said seat portion and said inner panel of said respective side wall of said automobile body structure thereby to provide jointly with said supporting surface in said recess as essentially continuous transverse extension of said top surface of said seat portion of said seat.

2. An automobile body structure as claimed in claim 1 in which said cushion member is also adapted removably to be mounted on said housing below said window frame therein thereby to provide an arm rest for a person sitting on said seat when said housing is disposed in said retracted position thereof.

3. An automobile body structure as claimed in claim 2 in which said cushion member is adapted removably to be mounted within said recess in said housing so as to project transversely inwardly beyond said inner panel of said housing so to provide said arm rest.

4. An automobile body structure as claimed in claim 1 in which said supporting surface in said recess in said housing is formed so as to be resiliently compressible.

5. An automobile body structure as claimed in claim 1 which additionally comprises releasable latching means for releasably retaining said housing in either of said retracted and extended positions thereof.

6. An automobile body structure as claimed in claim 1 in which a said housing is mounted in the specified manner on each said side wall of said automobile body structure at each end of said rest.

7. An automobile body structure as claimed in cliam 1 in which said housing is hingedly mounted in the manner specified in a door which is in turn hingedly mounted along a side edge thereof in a respective one of said side walls of said automobile body structure.

8. An automobile body structure as claimed in claim 7 in which said supporting surface in said recess in said housing is formed so as to be resiliently compressible.

9. An automobile body structure as claimed in claim 7 which additionally comprises releasable latching means for releasably retaining said housing in either of said retracted and extended positions thereof.

10. An automobile body structure as claimed in claim 7 in which a said housing is mounted in the specified manner in two said doors provided in said automobile body structure at both transverse ends of said seat thereof.

11. An automobile body structure as claimed in claim 7 in which said cushion member is also adapted removably to be mounted on said housing below said window frame therein thereby to provide an arm rest for a person sitting on said seat when said housing is disposed in said retracted position thereof.

12. An automobile body structure as claimed in claim 11 in which said cushion member is adapted removably to be mounted within said recess in said housing so as to project transversely inwardly beyond said inner panel of said housing so as to provide said arm rest.

13. An automobile body structure as claimed in claim 12 in which said recess in said housing is defined by front and rear side webs and by a bottom web, said webs extending transversely outwardly from said inner panel of said housing to said intermediate panel thereof.

14. An automobile body structure as claimed in claim 13 in which said cushion member is provided at each end thereof with supporting means adapted for releasable mating with cooperating means provided on respective ones of said front and rear side webs defining said recess in said housing thereby removably to support said cushion member in said recess upwardly of said bottom web defining said recess.

15. An automobile body structure as claimed in claim 14 which additionally comprises a releasable latching means for releasably retaining said housing in either of said retracted and extended positions thereof and which releasable latching means in turn includes a manually operable latch-releasing member mounted on said inner panel of said housing below said bottom web defining said recess in said housing.

16. An automobile body structure as claimed in claim 15 and which additionally comprises a window position-adjusting handle for moving said window pane between said raised and lowered positions thereof, said handle being mounted on said inner panel of said housing.

17. An automobile body structure as claimed in claim 16 and which additionally comprises a door latch-actuating member mounted on said inner panel of said door outwardly of said housing.

18. An automobile body structure as claimed in claim 17 in which a said housing is mounted in the specified manner in two said doors provided in said automobile body structure at both transverse ends of said seat thereof.

19. A door for an automobile, which door comprises:

a frame including an outer wall;
a housing defined by top, bottom and front and rear side edges, having an inner panel and outwardly spaced apart therefrom an outer panel, and hingedly mounted along said top edge thereof in said frame for movement between an outer extended position and an inner retracted position in which said outer panel of said housing is essentially continuous with said outer wall of said frame;
an opening in said inner panel of said housing and peripherally defining a recess extending transversely outwardly into said housing from said inner panel thereof;
an intermediate panel in said housing spaced apart transversely inwardly from said outer panel of said housing outwardly to define said recess and to define with said outer panel of said housing a window-receiving compartment;
a window frame constituted by an opening in an upper portion of said housing above said recess therein;
a window pane movably mounted in said housing for movement between a raised position closing said opening constituting said window frame and a lowered position in which said window pane is at least partially disposed within said window-receiving compartment; and
an upwardly facing supporting surface provided in a lower part of said recess in said housing.

20. A door as claimed in claim 19 which additionally comprises a cushion member dimensioned for disposition between the seat portion of a seat and said door when said door is mounted on an automobile and when said housing is disposed in said extended position thereof so that a top surface of said cushion member is then essentially coplanar with the top surface of the seat portion of such a seat as well as with said supporting surface within said recess in said housing thereby to provide jointly with said supporting surface in said recess an essentially continuous transverse extension of the top surface of the seat portion of the seat.

21. A door as claimed in claim 20 in which said cushion member is also adapted removably to be mounted on said housing below said window frame therein thereby to provide an arm rest for a person sitting on the seat of the automobile when said door is mounted in an automobile and when said housing is disposed in said retracted position thereof.

22. A door as claimed in claim 21 in which said cushion member is adapted removably to be mounted within said recess in said housing so as to project transversely inwardly beyond said inner panel of said housing so to provide such an arm rest.

23. A door as claimed in claim 20 in which said supporting surface in said recess in said housing is formed so as to be resiliently compressible.

24. A door as claimed in claim 20 which additionally comprises releasable latching means for releasably retaining said housing in either of said retracted and extended positions thereof.

25. A door as claimed in claim 20 in which said recess in said housing is defined by front and rear side webs and by a bottom web, said webs extending transversely outwardly from said inner panel of said housing to said intermediate panel thereof.

26. A door as claimed in claim 25 in which said cushion member is provided at each end thereof with supporting means adapted for releasable mating with co-operating means provided on respective ones of said front and rear side webs defining said recess in said housing thereby removably to support said cushion member in said recess upwardly of said bottom web defining said recess.

27. A door as claimed in claim 25 which additionally comprises a releasable latching means for releasably retaining said housing in either of said retracted and extended positions thereof and which releasable latching means in turn includes a manually operable latch-releasing member mounted on said inner panel of said housing below said bottom web defining said recess in said housing.

28. A door as claimed in claim 25 and which additionally comprises a window position-adjusting handle for moving said window pane between said raised and lowered positions thereof, said handle being mounted on said inner panel of said housing.

29. A door as claimed in claim 25 and which additionally comprises a door latch-actuating member mounted on said inner panel of said door outwardly of said housing.

* * * * *